Feb. 19, 1935.  L. PETIT  1,992,091
PHOTOGRAPHIC ROLLER HOLDER
Filed May 4, 1932   2 Sheets-Sheet 1
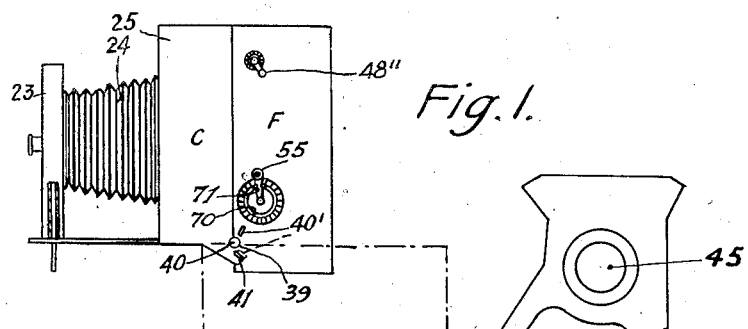
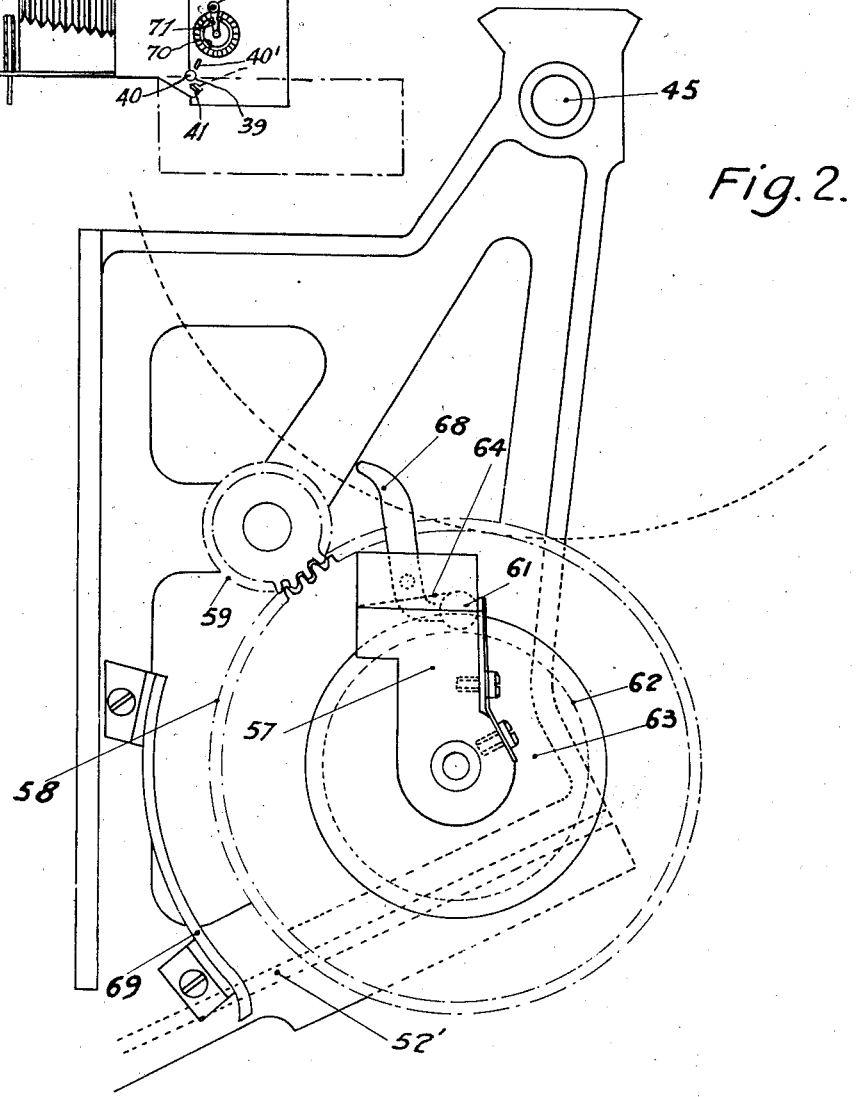

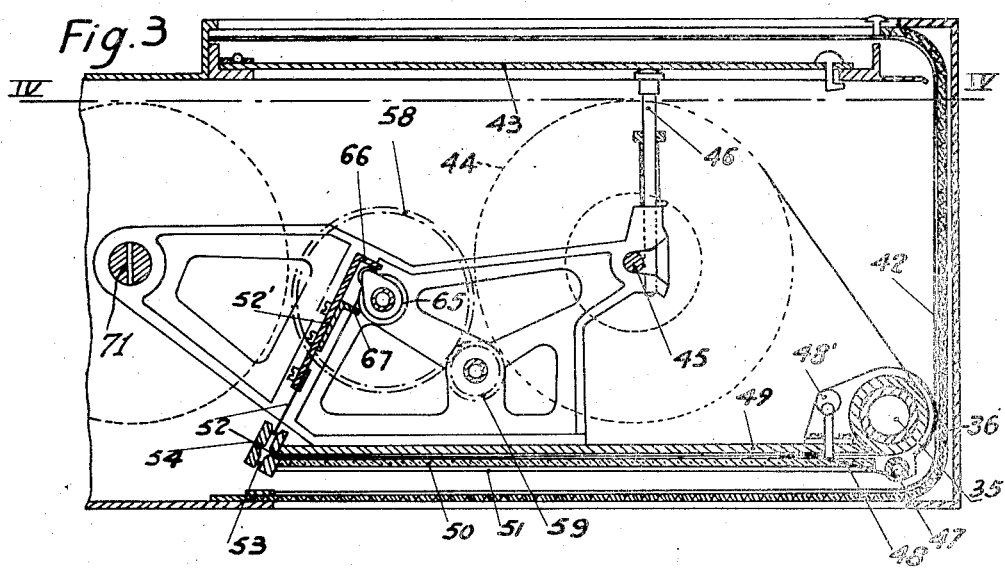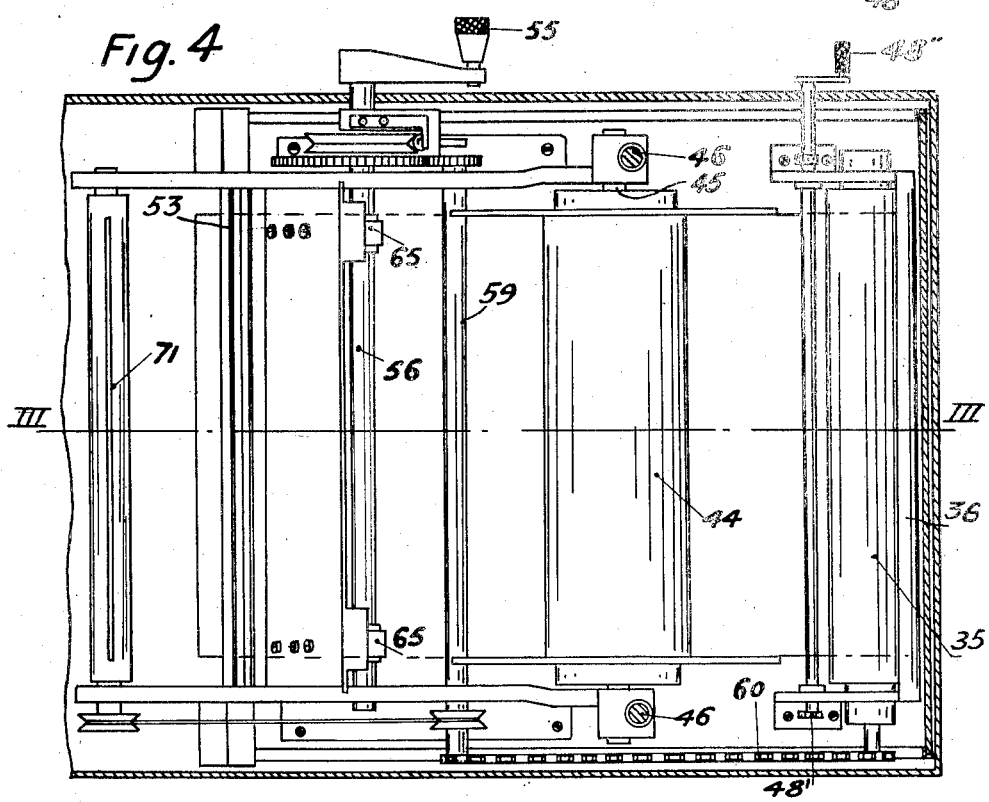

Patented Feb. 19, 1935

1,992,091

UNITED STATES PATENT OFFICE 1,992,091

PHOTOGRAPHIC ROLLER HOLDER

Louis Petit, Paris, France

Application May 4, 1932, Serial No. 609,243
In France May 9, 1931

8 Claims. (Cl. 95—34)

My invention has for its object a photographic reproducing apparatus and provides therefor a novel and improved paper-reel-holder which may be tipped round an axis to the rear of the photographic device and removed.

Further features of interest, relating interalia to the speedy unwinding and rewinding of the paper film and to the cutting or marking of the separation between successive printed pictures, will appear from the following description of a form of execution of my invention given by way of example and illustrated in accompanying drawings.

Fig. 1 is a side view thereof of the apparatus

Fig. 2 illustrates a detail of the same holder with its improved rockable paper-reel-holder.

Figs. 3 and 4 are transversal and longitudinal sectional views of the paper-reel-holder and its control means.

The photographic apparatus C comprises an objective-carrier 23. This objective carrier is connected through the bellows 24 with the rear part of the camera 25 which may carry in its turn the paper-reel-holder F.

The rear part of the camera is provided with a part circular recess 39 at its lower rear end in which the pivot 40 of the paper-reel-holder F is held.

This holder F may either be locked in its operative position behind the camera as shown in full lines in Fig. 1 or lowered when it is desired to focus into the position shown in dotted lines in Fig. 1 or else removed entirely. This may be necessary when the document to be photographed is secured to the rear of the camera and the paper to be printed laid on the document carrier, either in an ordinary frame or in the holder F itself.

The temporarily lowered holder is held against any tipping motion through the elongated projection 40' provided on one side thereof at least (Fig. 1) and adapted to abut against a part cylindrical projection surrounding the recess 39 of the camera casing, the weight of the rocked holder F being supported by another projection 41 raised on the camera casing and against which the projection 40' may rest.

Of course the holder F shown may be replaced behind the camera according to requirements by a ground glass, an ordinary holder containing only one paper or document or an illuminating system.

The holder F adapted for continuous and accurate working in all positions which is the chief object of my invention, is closed at its front by a screen 42 sliding in lateral slots and controlled from the rear. A door 43 is hingedly secured to the rear of the holder.

The unimpressed paper reel of any width is carried by the spool 44 rotatably held in the V-shaped notches 45 and locked therein by the bolts 46 which may be actuated by hand, or if not, are pushed into operative position by the door 43 as it is being closed.

The paper from the reel 44 is led over the feed spool 35 between the latter and a pressing spool 47 urged by the spring 48 against the feed spool.

The pressure of this spring may be released by the cam 48' the shaft carrying which is controlled through the crank 48" when it is desired to let the feed spool rotate without driving the paper. The paper from spool 47 is then caused to pass between the plate 49 and the glass 50, the space between the plate and the glass being held open by the metal linings 51 formed by U-shaped channels fitted over two opposed edges of the glass and held in place through yielding members arranged between the outer surface of the glass and the corresponding part of the channel, after exposure behind the glass, the paper which is urged forwards by the feed spool and which is not normally driven by any drum ahead of the glass arrives in front of the cutting device. The device is constituted by a knife or saw 52 engaging a sloping channel 53 crossing at right angles the sloping channel 54 through which the paper passes, the knife body passing through the channel 52' in the holder frame.

The control of the paper feed and cutting operations is provided as follows: A crank 55 on the outside of the holder F is secured to the shaft 56 to which is keyed the radial arm 57 and on which is mounted loosely the pinion 58 engaging a small pinion 59 adapted to drive the feed spool through the chain 60. The pinion 58 is constrained to move integrally with its shaft 56 in one direction only; to this end a ball 61 is wedged between a groove 62 in a wheel 63 integral with the pinion 58 and a sloping surface 64 formed on a part integral with the arm 57. Thus the crank moving, say, clockwise in the case of Fig. 5, will cause the ball 61 to be wedged between the cooperating surfaces 62 and 64 and thereby drive the pinion 58 and the feed spool.

On the other hand the shaft 56 carries two cams 65 adapted to move between the projections 66, 67 carried by the rear end of the knife or saw 52. Now if the crank begins rotating integrally with the pinion 58 through an angle corresponding to the advance of one picture length for the paper, means are provided for stopping this drive while the crank continues its rotation and urges the projection 67 forwards with the knife 52. These means are constituted by the small lever 68 pivotally carried by the arm 57 and adapted to unwedge the ball 61 as soon as the arm 57 has brought the lever 68 in front of the cam-shaped part 69. This causes the lever to pivot slightly and to unwedge the ball 61. The shaft 56 may thus continue rotating and drive the cutting blade 52 to the required extent without driving the pinion 58. The drive of the cutter may begin before or after the pinion 58 has been set free and continues as desired until the paper is cut or simply marked at the separation between the pictures. The stopping of the cutting operation is provided by the abutment of the crank 55 against the adjustable stop 70. The crank is then returned in the opposite direction which of course has no action on the pinion 58 until it abuts against the second stop 71, the position of which is adjusted with reference to the cam 69 in a manner such that the drive of pinion 58 by the next forward movement of the crank may correspond to the advance of the paper through the length of one picture.

The cut pictures fall into the lower part of holder F. If the pictures are not completely cut, a removable and disconnectible slotted roller 72 may be disposed on said lower part for rewinding purposes.

What I claim is:

1. In a photographic apparatus the provision of a paper-reel-holder, a pivot at the lower forward end thereof, flanges provided with a part circular recess at the rear lower part of the photographic apparatus for removably carrying said pivot and means preventing the holder when pivoting round its axis to pass underneath a substantially horizontal position.

2. In a photographic apparatus the provision of a paper-reel-holder adapted to be pivotally secured to the rear of the photographic apparatus, a paper-reel rotatably held in the holder, a feed reel over which the paper is adapted to pass, a gate, means controlling the feed reel, means for pressing the paper against the feed reel with a pressure sufficient to ensure its being pushed into the gate and means for disconnecting last mentioned means.

3. A paper-reel-holder for photographic apparatuses comprising a casing, a paper-reel rotatably held in the casing, a feed reel over which the paper is adapted to pass, a gate, means controlling the feed reel, means for pressing the paper against the feed reel with a pressure sufficient to ensure its being pushed into the gate, means for disconnecting last-mentioned means and a cutter controlled by the feed reel control means adapted to cut or mark the paper against the outer end of the gate.

4. A paper-reel-holder for a photographic apparatus adapted to be pivotally secured to the rear of the latter comprising a casing, a paper reel rotatably held in the casing, a feed reel over which the paper is adapted to pass, a gate, means controlling the feed reel, means for pressing the paper against the feed reel with a pressure sufficient to ensure its being pushed through the gate, means for disconnecting last-mentioned means, a cutter controlled by the feed reel control means adapted to engage the paper at the outer end of the gate and a disconnectible rewinding reel adapted to be rotatably carried by the holder on the side of the gate away from the feed reel.

5. A paper-reel-holder for photographic apparatus adapted to be pivotally secured to the rear of the latter comprising a casing, a paper-reel rotatably held in the casing, a feed reel over which the paper is adapted to pass, a gate, means controlling the feed reel, means for pressing the paper against the feed reel with a pressure sufficient to ensure its being pushed into the gate, means for disconnecting last mentioned means, a part of small height provided with two slots crossing one another through one of which the paper passing out of the gate is adapted to pass and a blade adapted to pass through the other slot and controlled by the feed reel control means when it has finished actuating the feed reel.

6. A photographic paper-reel-holder comprising a casing, a paper-reel rotatably held in the casing, a feed reel over which the paper is adapted to pass, a gate, means for pressing the paper against the feed reel with a pressure sufficient to ensure its being pushed into the gate, means for disconnecting last-mentioned means, a shaft, a pinion mounted on said shaft, means whereby said pinion controls the feed reel, a crank controlling the shaft, adjustable stops limiting the angular movement of the crank and shaft, means for making the pinion rotate with the shaft in one direction only, means for rendering last-mentioned means inoperative for the latter part of the operative rotation of the crank and a cutter controlled by the shaft for cutting or making the paper at the point where it passes out of the gate after the said paper has ceased advancing.

7. A photographic paper-reel-holder comprising a casing, a paper-reel rotatably held in the casing, a feed reel over which the paper is adapted to pass, a gate, means for pressing the paper against the feed reel with a pressure sufficient to ensure its being pushed through the gate, means for disconnecting last-mentioned means, a shaft, a pinion mounted on said shaft, means whereby said pinion controls the feed reel, a crank controlling the shaft, adjustable stops limiting the angular movement of the crank and shaft, a grooved wheel rigidly secured to the pinion, a radial arm rigid with the shaft and provided with a sloping surface facing the groove of the wheel, a ball held between the groove and the sloping surface and adapted to be wedged between them for one direction of rotation of the shaft for making the pinion rotate with said shaft, a lever pivotally secured to the radial arm and adapted when rocked to unwedge the ball, a cam shaped surface in the path of the end of the lever adapted to rock same during the latter part of the operative rotation of the crank and a cutter disposed in front of the paper as it passes out of the gate and controlled by the shaft for operatively engaging the paper during the said latter part of the operative rotation of the crank.

8. A photographic paper-reel-holder comprising a casing, a paper-reel rotatably held in the casing, a feed reel over which the paper is adapted to pass, a gate, means for pressing the paper against the feed reel with a pressure sufficient to ensure its being pushed into the gate, means for disconnecting last-mentioned means, a shaft, a pinion mounted on said shaft, means whereby said pinion controls the feed reel, a crank controlling the shaft, adjustable stops limiting the angular movement of the crank and shaft, means for making the pinion rotate with the shaft in one direction only, means for rendering last-mentioned means inoperative for the latter part of the operative rotation of the crank, a cam on the shaft, a cutter disposed in front of the paper as it passes out of the gate and means whereby the cam is adapted to push the cutter into operative engagement with the paper at the end of the operative rotation of the crank and to retract it when the crank is returned backwards.

LOUIS PETIT.